(12) United States Patent
Gustave et al.

(10) Patent No.: US 8,516,259 B2
(45) Date of Patent: Aug. 20, 2013

(54) VERIFYING AUTHENTICITY OF VOICE MAIL PARTICIPANTS IN TELEPHONY NETWORKS

(75) Inventors: Christophe Gustave, Ottawa (CA); Stanley Chow, Ottawa (CA); Shu-Lin Chen, Kanata (CA)

(73) Assignee: Alcatel Lucent, Paris (FR)

( * ) Notice: Subject to any disclaimer, the term of this patent is extended or adjusted under 35 U.S.C. 154(b) by 1218 days.

(21) Appl. No.: 12/231,430

(22) Filed: Sep. 3, 2008

(65) Prior Publication Data

US 2010/0054433 A1    Mar. 4, 2010

(51) Int. Cl.
*H04M 1/64* (2006.01)
*H04L 9/08* (2006.01)

(52) U.S. Cl.
USPC ........... 713/175; 713/168; 713/169; 713/170; 713/182; 379/88.2; 379/88.21; 379/88.22; 379/88.23

(58) Field of Classification Search
USPC ............... 713/168–170, 175, 179, 182, 186; 379/88.2, 88.21, 88.22, 88.23
See application file for complete search history.

(56) References Cited

U.S. PATENT DOCUMENTS

| | | | |
|---|---|---|---|
| 6,324,271 B1* | 11/2001 | Sawyer et al. | 379/142.05 |
| 6,741,705 B1* | 5/2004 | Nelson et al. | 380/257 |
| 6,990,581 B1* | 1/2006 | Rubin | 713/170 |
| 2003/0051133 A1* | 3/2003 | Pearson | 713/155 |
| 2003/0217165 A1 | 11/2003 | Buch et al. | |
| 2004/0008666 A1* | 1/2004 | Hardjono | 370/352 |
| 2005/0122965 A1* | 6/2005 | Heinla et al. | 370/357 |
| 2006/0143271 A1* | 6/2006 | Murphy et al. | 709/206 |
| 2007/0036302 A1* | 2/2007 | Cho | 379/88.23 |
| 2007/0101144 A1* | 5/2007 | Owen et al. | 713/176 |
| 2008/0181379 A1* | 7/2008 | Chow et al. | 379/142.05 |
| 2008/0181380 A1* | 7/2008 | Gustave et al. | 379/142.05 |
| 2008/0187119 A1* | 8/2008 | Vinokurov et al. | 379/142.05 |
| 2008/0254772 A1* | 10/2008 | Bender et al. | 455/413 |
| 2009/0276217 A1* | 11/2009 | Saha et al. | 704/246 |

FOREIGN PATENT DOCUMENTS

| | | |
|---|---|---|
| GB | 2442040 A | 3/2008 |
| JP | 2007-529169 A | 10/2007 |
| WO | 2005074407 A2 | 8/2005 |

OTHER PUBLICATIONS

Stanley Chow et al, Authenticated Names, pp. 23-32, ACM, Sep. 2007.*
Shu-Lin Chen, Prototyping a New Identity Authentication Framework for IP Telephony, pp. 47-52, IEEE 2008.*

(Continued)

*Primary Examiner* — Philip Chea
*Assistant Examiner* — Shanto M Abedin
(74) *Attorney, Agent, or Firm* — Garlick & Markison; Holly L. Rudnick

(57) ABSTRACT

A method includes receiving an authentication certificate of a voice mail account holder and/or an authentication certificate of a caller wanting to leave a voice mail message the holders' voice mail account. A voice mail apparatus that provides voice mail service for the voice mail account holder performs such receiving. The account holder and/or the caller are authenticated after receiving the authentication certificate of the party being authenticated. Authenticating the account holder and/or the caller is performed using authentication information contained within the respective certificate. After such authentication is successfully performed, a voice mail message record can be created in the account of the account holder. Such creating includes allowing the caller to store the message in the account of the account holder in addition to associating authenticated identification information of the caller with the message and/or providing authenticated identification of the account holder to the caller.

19 Claims, 6 Drawing Sheets

(56) References Cited

OTHER PUBLICATIONS

B. Campbell et al, Control of Service Context using SIP Request—URI, RFC: 3087, Apr. 2001.*

Samer El Sawda et al, Non Repudiation for SIP Protocol SIP Sign, ICTTA, Apr. 2008.*

Chou W: "Strategies to Keep Your VoIP Network Secure" IT Professional, IEEE Service Center, Los Alamitos, CA: vol. 9, No. 5, Sep. 1, 2007; XP011193611.

Butcher et al: "Security Challenge and Defense in VoIP Infrastructure," IEEE Transactions on Systems Man, and Cypernetics: Part C: Applications and Reviews, vol. 37, No. 6, Nov. 1, 2007; XP0111193943.

International Search Report: PCT/IB2009/054061 dated Dec. 23, 2009, 7 pages.

Chou W: "Strategies to Keep Your VoIP Network Secure" I Professional, IEEE Service Center, Los Alamitos, CA; vol. 9, No. 5, Sep. 1, 2007; XP011193611.

David Butcher et al: "Security Challenge and Defense in VoIP Infrastructures"; IEEE Transactions on Systems, Man, and Cybernetics: Part C: Applications and Reviews, vol. 37, No. 6, Nov. 1, 2007; XP0111193943.

* cited by examiner

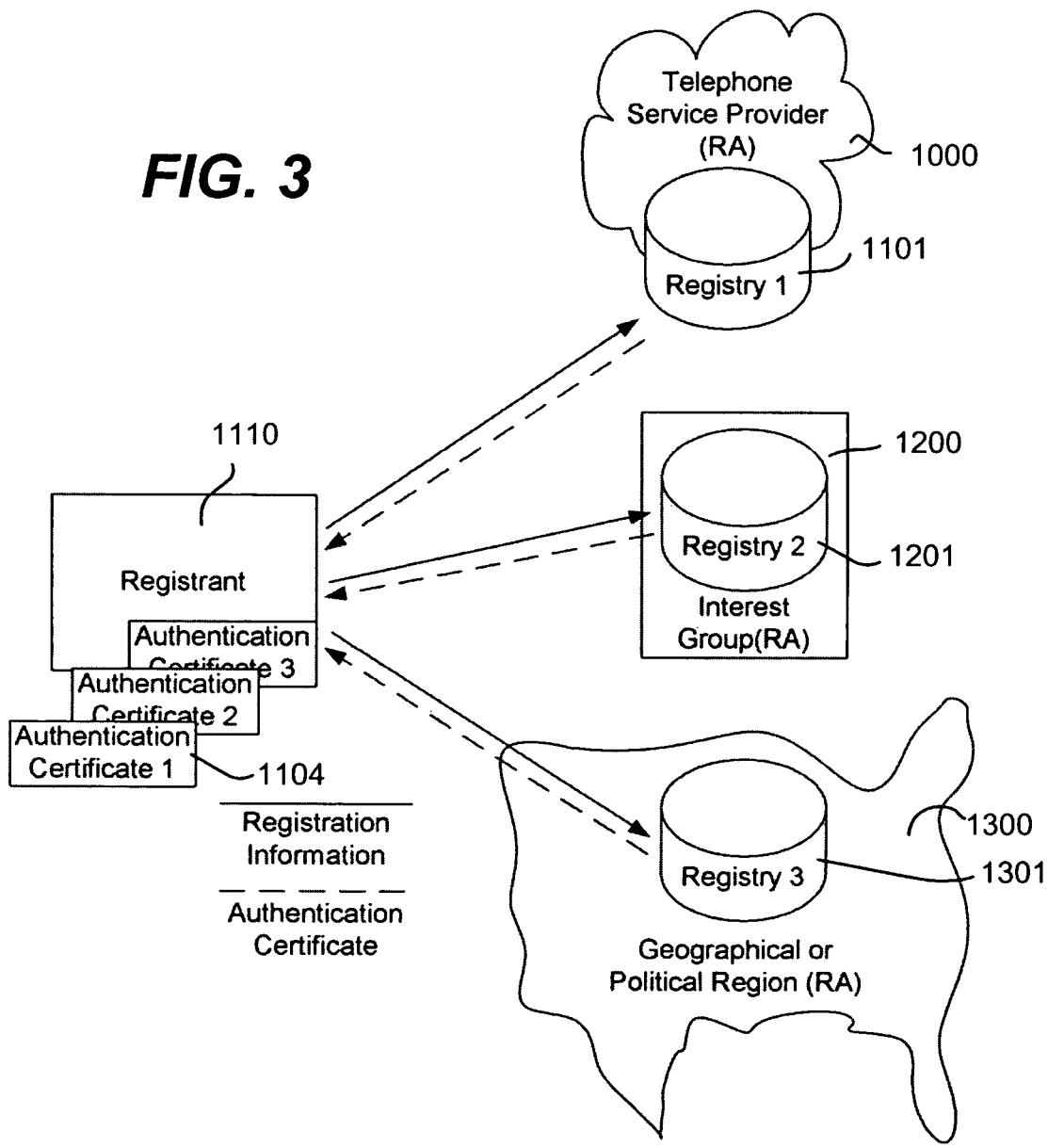

VERIFYING AUTHENTICITY OF VOICE MAIL PARTICIPANTS IN TELEPHONY NETWORKS

FIELD OF THE DISCLOSURE

The disclosures made herein relate generally to authentication provisions in telephony network systems and, more particularly, to verifying authenticity of voice mail participants.

BACKGROUND

Fraud related to identity theft schemes is becoming very prevalent in today's intricate telephony (e.g., voice/data) networks Malicious entities are taking advantage of well-established social behavior to gather confidential (i.e., sensitive) information. Identity theft has also become a serious problem nearly everywhere in the world. Identity thieves leverage a false sense of security that telephony users have when it comes to phone systems, thereby tricking phone users into disclosing confidential information. In some instances, it is a calling party (i.e., caller) attempting to obtain confidential information from a called party for the purpose of committing malicious acts (e.g., criminal and/or deceitful acts) with such confidential information. In other instances, it is the called party attempting to obtain confidential information from a calling party for the purpose of committing malicious acts with such confidential information.

A specific instance in which a malicious party can attempt to obtain confidential information relates to leaving and retrieving voicemail messages. When person A calls person B and has the option to leave a voice mail message for person B, there are two aspects to leaving such a message where authentication is beneficial to limiting the potential for a malicious party to obtain confidential information from an unknowing voice mail participant. The first aspect is identifying person A as actually being the caller leaving the message and the second aspect is identifying person B as actually being the person whose voice mail is receiving the message (i.e., typically, the owner of the voice mail account on which the voice mail message is left).

Currently, there is no real solution for authenticating that a person leaving a message is actually the person that they say they are or infer they are. Some conventional (i.e., prior art) systems can be configured to record Caller ID information of a person leaving a message for them, but Caller ID is easily spoofed and is not suitable for authentication of calling parties. Most people retrieving a voice mail message just rely on the voice of the caller to determine if it is a person they know. If the voice is not known to the person retrieving the message or the person leaving the message is obviously not known to the person retrieving the voice mail message, the person retrieving the voice mail message simply relies upon their own intuition with regard to the person leaving the message and the content of the message. For example, in some instances, a person leaving a voice mail message may claim to be from a well-known organization of the called party, but is not personally known to the person whose voice mail account receives the voice message. There are no known solutions for such an instance in which a voice mail message is left (e.g., even if Caller ID were secure, the phone number would typically not be meaningful to the person receiving the message). Yet, authentication of such voice mail messages is increasingly important because many types of fraud (i.e., identity theft amongst them) make use of this exact weakness in voice mail messaging.

Furthermore, there is currently no real solution for authenticating that the voice mail account on which a message is being left is the intended voice mail account of a caller. Such authentication is important for any number of reasons. One reason includes the situation where a caller inadvertently dials the wrong number. Another reason includes the situation where a caller is spoofed into believing that they are leaving a message on an intended voice mail message account, but are in fact leaving the message on a different voice mail message account. Still another reason is the situation where a caller is delivering sensitive information and wants to positively authenticate a voice mail account holder prior to leaving such sensitive information. Thus, it can be seen that the current deficiency with respect to not allowing a caller to authenticate the voice mail account holder of a voice mail account on which they intend to leave a message creates the potential for messages being left in unintended voice mail accounts.

With respect to the potential that the person retrieving the voicemail message may not be authorized to receive and/or retrieve such message, prior art mechanisms for such authorization usually involve weak authentication schemes opening wide voice mail boxes to fraudulent access. In some instances, voice mail systems even assumed the identity of a user based on insecure "caller ID" data, which can be easily and readily forged. It is well known that such caller ID based access to voice mail system accounts can result in unauthorized administrative system-wide access and/or access to individual voice mail accounts. Similarly, using password-based authentication poses management problems that cannot be easily avoided. In addition to the theft of potentially sensitive information, hacking into poorly protected voice mail systems can lead to malicious activities aimed at perpetrating costly phone calls and the like.

In U.S. Pat. No. 6,912,275 (i.e., the '275 patent), which is entitled "Secure Remote Access to Voice Mail", user access to the mailbox is authenticated through one time password (OTP) technique. In general, OTP suffers from man-in-the-middle vulnerabilities that can result in a malicious party successfully obtaining confidential/sensitive information from an unknowing voice mail message recipient. Moreover, clients of voice mail systems configured in accordance with the inventive subject matter taught in the '275 patent need to be provisioned with OTP tokens, which make such a solution expensive to deploy/manage.

Therefore, a solution for verifying authenticity of voice mail participants in a manner that overcomes shortcomings and/or deficiencies of prior art solutions would be advantageous, desirable and useful.

SUMMARY OF THE DISCLOSURE

Embodiments of the present invention address the problem of parties in a voice mail session not being authenticated when accessing the voice mail system. More specifically, to prevent unauthorized access to confidential information contained in voice mail messages, voice mail systems and apparatuses configured in accordance with the present invention, provide for authentication of a person leaving a voice mail message and a person retrieving the voice mail message. Through such authentication, a caller can be reasonably assured that they are leaving the voice mail message for the intended recipient and the recipient can be reasonably assured that the message was left by a credible caller. Thus, such authentication reduces the potential for either the party leaving the voice mail message (i.e., the caller) or the recipient (i.e., the called party) unknowingly partaking in fraudulent or malicious activities.

The present invention provides solutions for authenticating voice mail session participants, thus thwarting threats related to spoofing of user identity. Specifically, embodiments of the present invention are directed to enabling a calling party to unambiguously and reliably identify a called party identity (i.e., a voice mail account holder) through an authentication notice delivered to his/her telephony apparatus on a per-call basis. A registry holds authenticated identification information of the called party. The called party initially registers its identification information to the registry. Upon successful registration, the registry (i.e., operating as a certificate authority) signs the certificate embedded with the identification and the public key of the called party. Upon call set-up, the calling party uses a means such as, for example, an asymmetric key cryptographic function to authenticate the identity of the called party. Accordingly, the present invention provides real-time authentication of a called parties in telephony networks, thereby alleviating the burden for a user to query—either directly to the called party or through other out-of-band means—proof of identity of a party being called.

In one embodiment of the present invention, a method for performing voice mail messaging authentication comprises a plurality of operations. An operation is performed for receiving an authentication certificate of a voice mail account holder and/or an authentication certificate of a caller requesting authorization to leave a voice mail message for the voice mail account holder. Such receiving is performed by a voice mail messaging apparatus that provides voice mail messaging service for the voice mail account holder. An operation is performed for authenticating the voice mail account holder and/or the caller in response to receiving the account holder authentication certificate and/or the caller authentication certificate. Authenticating the voice mail account holder and/or the caller is performed using authentication information contained within the respective authentication certificates. An operation is performed for creating a voice mail message record a voice mail account of the voice mail account holder in response to successfully performing such authentication. Such creating includes allowing the caller to store the voice mail message in the voice mail account of the voice mail account holder in addition to associating authenticated identification information of the caller with the voice mail message and/or providing authenticated identification of the voice mail account holder to the caller.

In another embodiment of the present invention, a server includes a storage apparatus and processor-executable instructions stored on and accessible from the storage apparatus. The processor-executable instructions are configured to carry out various operations. Processor-executable instructions are provided for receiving an authentication certificate of a caller requesting authorization to leave a voice mail message for a called party. Such receiving is performed by a voice mail messaging apparatus that provides voice mail messaging service for the called party. Processor-executable instructions are provided for performing caller authentication using authentication information contained within the authentication certificate in response to receiving the authentication certificate. Processor-executable instructions are provided for creating a voice mail message record in a voice mail account of the called party in response to successfully authenticating the caller. Such creating includes allowing the caller to store the voice mail message in the voice mail account of the called party and associating authenticated identification information of the caller with the voice mail message.

In another embodiment of the present invention, a voice mail messaging apparatus provides voice mail messaging service for a called party. The voice mail messaging apparatus is configured to: to: i.) receive an authentication certificate of a caller requesting authorization to leave a voice mail message for a called party; ii.) perform caller authentication using authentication information contained within the authentication certificate in response to receiving the authentication certificate; and iii.) create a voice mail message record in a voice mail account of the called party in response to successfully authenticating the caller, wherein being configured to create includes being configured to create allow the caller to store the voice mail message in the voice mail account of the called party and associating authenticated identification information of the caller with the voice mail message.

These and other objects, embodiments, advantages and/or distinctions of the present invention will become readily apparent upon further review of the following specification, associated drawings and appended claims.

BRIEF DESCRIPTION OF THE DRAWINGS

FIG. 3 is a schematic diagram of a registration infrastructure and process for information provider registration in accordance with the present invention.

DETAILED DESCRIPTION OF THE DRAWING FIGURES

Embodiments of the present invention can be readily implemented on a variety of voice mail systems and telephony devices (e.g., cell phones, PDA's and the like). Such embodiments leverage strong cryptography functions based on X.509 certificates delivered through trusted Certificate Authority registries, thereby allowing authentication of a called party to be authenticated in association with leaving that party a voice mail message and/or allowing authentication of a calling party prior to allowing that party to leave such voice mail message. In this manner, telephony equipment that are able to display a list of voice mail messages can advantageously incorporate this feature by displaying authenticated identity information behind the voice mail message (i.e., when acting as an outbound messaging participant) and by facilitating voice mail screening (i.e., when acting as an inbound messaging participant).

The present invention provides for a heightened level of security associated with voice mail system access while minimizing the burden cost associated with conventional OTP systems management inherent to the best known existing solutions (i.e., prior art). In accordance with embodiments of the present invention, X.509 certificates are used in a cryptography procedure (e.g., a standard asymmetric cryptography procedure) to provide voice mail apparatuses with strong authentication support for further access control and screening actions. In this manner, in one embodiment, a voice mail server is provisioned with a list of trusted certificate authorities (i.e., including the public portion of X.509 certificate). The voice mail client at the user premise (e.g., PSTN phone, soft phone, cell phone, etc.) is configured with a X.509 certificate holding its public key, along with the corresponding private key. When a user connects to the voice mail server provisioned in accordance with the present invention, an asymmetric cryptography procedure is triggered and a pre-configured filtering policy is applied depending on the authentication result. In a similar manner, the caller may want to check the identity of the voice mail recipient (i.e., voice mail account holder) before leaving a message. Finally, in the case where the voice mail system is untrusted, the present invention can be extended for providing end-to-end secured voice message delivery and delivery and acknowledged identity for the called entity.

Figure 1A:
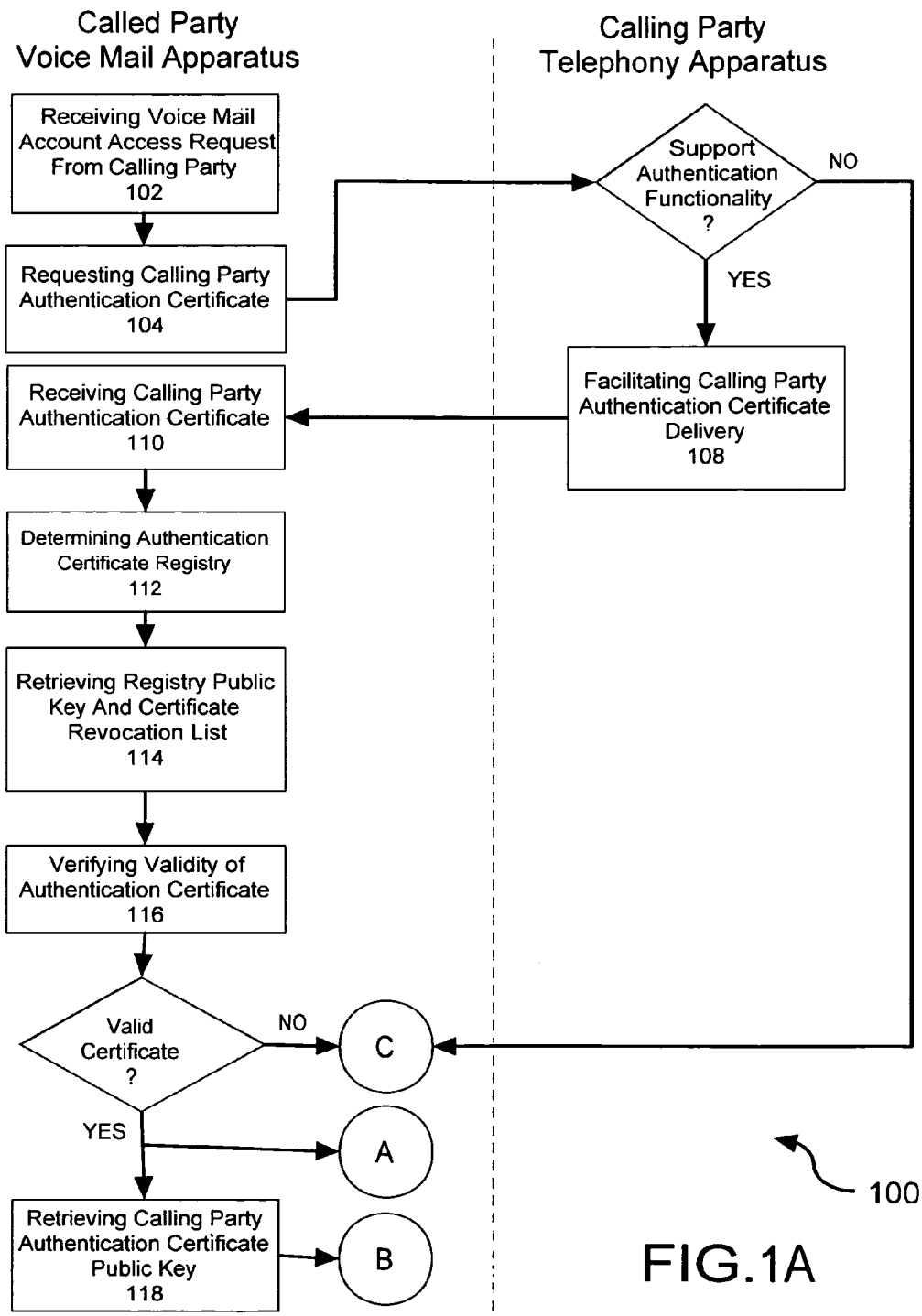
FIGS. 1A and 1B show a method configured for facilitating calling party authentication during a voice mail session in accordance with the present invention.
Figure 1B:
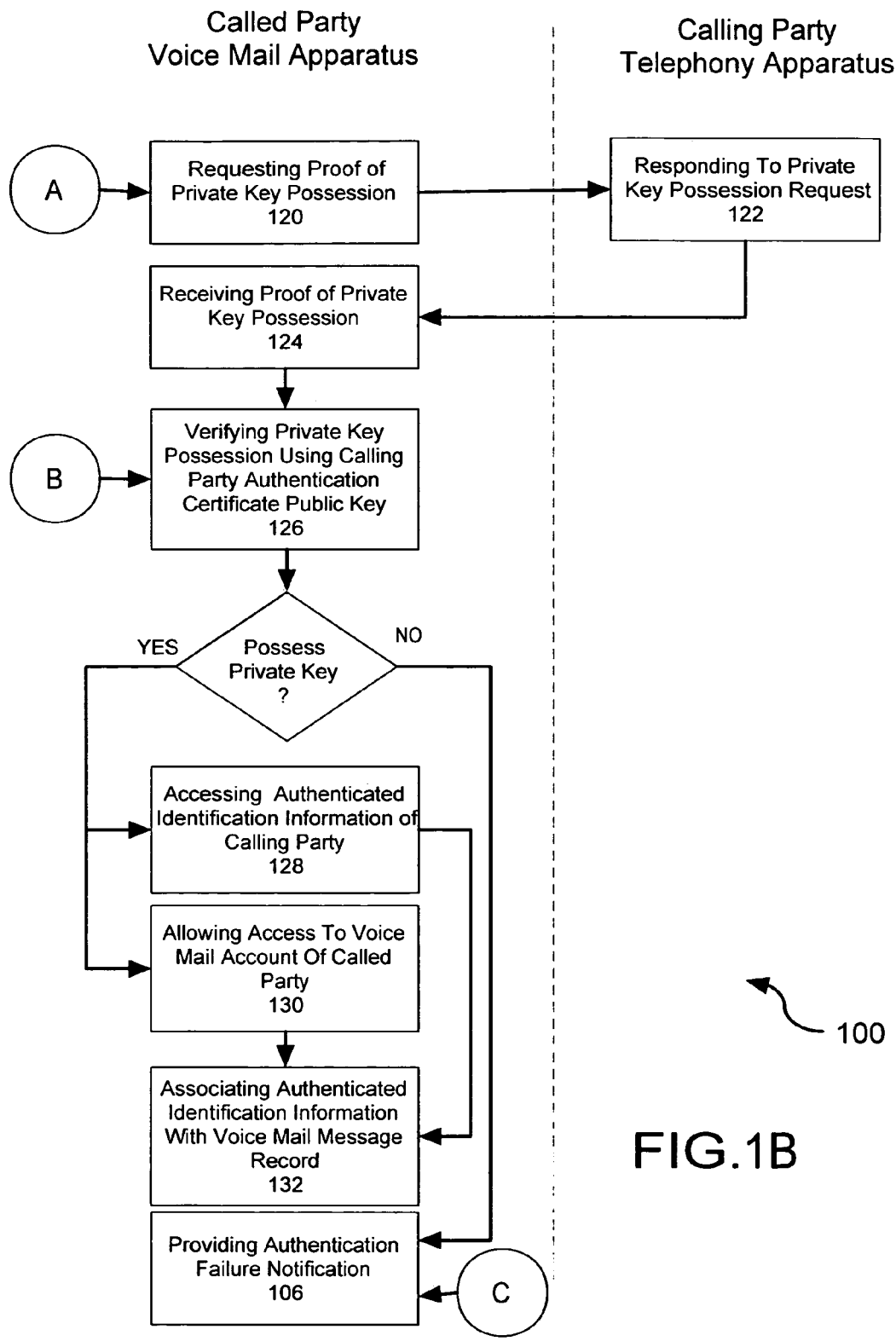

Referring now to FIGS. 1A and 1B, a method 100 configured in accordance with the present invention for authenticating a caller wanting to access a voice mail account on a voice mail apparatus of a called party is shown. There are at least two different scenarios where such access is being requested. In one such scenario, a user of the voice mail apparatus (i.e., a caller) is requesting administrative rights to access messages in a voice mail account (i.e., listen to or reading voice mail messages in a voice mailbox). In another such scenario, a caller is requesting to be allowed to leave a voice mail message in a voice mail account (i.e., voice mailbox) of a voice mail apparatus. In both scenarios, the voice mail apparatus and a telephony apparatus of the caller are jointly configured for performing authentication using X.509 certificates. For example, the voice mail apparatus is pre-configured with a list of trusted root Certificate Authorities and the caller's telephony apparatus is provisioned with an authentication certificate having a authenticated (i.e., certified) identity, genuine name or the like. It is disclosed herein that an authentication module configured in accordance with the present invention for providing voice mail participant authentication can indifferently be deployed on a standalone voice mail box embedded with an end-user telephony apparatus or as part of a voice mail apparatus (e.g., server) such as an IP-PBX. Depending on implementation/deployment choices, an authentication certificate used during authentication can be either embedded into a user telephony apparatus or in an authentication token (e.g., Smartcard, USB-based, etc.) that is itself pluggable into the user telephony apparatus.

Referring to FIG. 1A, an operation 102 is performed by a called party voice mail apparatus for receiving a request from a calling party (i.e., a caller) for accessing a voice mail account on the called party voice mail apparatus. In response to receiving such request, an operation 104 is performed by the called party voice mail apparatus for requesting a calling party authentication certificate. In one embodiment, requesting the called party authentication triggers a respective component of authentication functionality in accordance with the present invention, which is provided for by the called party voice mail apparatus. If the calling party telephony apparatus does not support authentication functionality in accordance with the present invention, the called party voice mail apparatus performs an operation 106 (FIG. 1B) for providing an authentication failure notification to notification to the calling party telephony apparatus indicating that the calling party telephony apparatus does not support authentication functionality in accordance with the present invention. Examples of providing the authentication failure notification include, but are not limited to, an audible message and/or visual message indicating that the calling party telephony apparatus does not support authentication functionality in accordance with the present invention. In addition to providing the authentication failure notification, it is disclosed herein that a pre-configured optional policy can dictate further action to be taken in the case of the calling party telephony apparatus not supporting authentication functionality in accordance with the present invention (e.g. trigger an alarm function to appropriate network configuration management equipment associated with the called party voice mail apparatus).

If the calling party telephony apparatus does support authentication functionality in accordance with the present invention, an operation 108 is performed by the calling party telephony apparatus for facilitating called party authentication certificate delivery. For example, in one embodiment, facilitating called party authentication certificate delivery includes accessing the called party authentication certificate and transmitting it for reception by the called party voice mail apparatus. In another embodiment, facilitating calling party authentication certificate delivery includes instructing a remote system or apparatus to transmit the called party authentication certificate for reception by the called party voice mail apparatus. Accordingly, the present invention is not limited to any particular approach for facilitating delivery of the called party authentication certificate to the called party voice mail apparatus.

In response to the called party voice mail apparatus performing an operation 110 for receiving the calling party authentication certificate, the called party voice mail apparatus performs an operation 112 for determining an authentication certificate registry that issued the calling party authentication certificate, followed by performing an operation 114 for retrieving a registry public key and certificate revocation list therefrom. Using such retrieved information, the called party voice mail apparatus performs an operation 116 for verifying validity of the calling party authentication certificate. For example, providing the calling party authentication certificate is not on a retrieved certificate revocation list, is not expired, etc, verifying authenticity of the authentication certificate include using include using the registry public key to determine if the calling party authentication certificate was signed by the private key of the authentication certificate registry. If it is determined that the calling party authentication certificate is not authentic (e.g., was not signed by the registry's private key) or if the calling party authentication certificate is on the certificate revocation list, expired, etc, the called party voice mail apparatus performs the operation 106 (or variant thereof) for providing an authentication failure notification (FIG. 1B). If it is determined that the calling party authentication certificate is authentic (e.g., was signed by the registry's private key) and the calling party authentication certificate is not on the certificate revocation list, expired, etc, the called party voice mail apparatus performs the operation 118 for retrieving the public key from the calling party authentication certificate and performs an operation 120 for requesting proof from the calling party that the private key corresponding to the calling party authentication certificate is in its possession (FIG. 1B). In response to requesting such proof, the calling party telephony apparatus performs an operation 122 for responding to the request thereby causing such proof (i.e., alleged proof at this point) to be transmitted for reception by the called party voice mail apparatus. In response to such proof being sent, the called party voice mail apparatus performs an operation 124 for receiving the proof of private key possession from the calling party telephony apparatus. After receiving the proof of private key possession, the called party voice mail apparatus performs an operation 126 that verifies authenticity of such proof using the public key of the calling party authentication certificate.

It is disclosed herein that the calling party can be an individual or a group of individuals (e.g., a business entity). Thus, a response to the request for proof from the calling party that the private key corresponding to the calling party authentication certificate is in its possession can be from a specific individual or from one or more individuals authorized or capable of responding to such request. Furthermore, the response can be that of a system of the calling party (e.g., a PBX of a business entity) or that of a telephone device (e.g., cell telephone) of the calling party. In this manner, the response can be provided in an automated manner (e.g., by a device or system) or can be provided at the command of a person (e.g., in response to their entering a passcode that causes the required proof to be transmitted for reception by the called party voice mail apparatus).

The objective in requesting such proof is to verify that the private key corresponding to the called party authentication certificate is in possession of the calling party. One embodiment of requesting such proof includes the called party voice mail apparatus generating a random number (i.e., a "nonce") and transmitting the nonce for reception by the calling party telephony apparatus. In response to receiving the nonce, the calling party telephony apparatus encrypts the nonce with called party's private key (i.e., the private key corresponding to the calling party authentication certificate) and transmits the encrypted nonce for reception by the called party voice mail apparatus. In response to receiving the encrypted nonce, the called party voice mail apparatus uses the public key retrieved from the calling party authentication certificate to decrypt the encrypted nonce. If the decrypted nonce is the same as that sent, it is assumed that the private key corresponding to the calling party authentication certificate is in the possession of the calling party (e.g., in possession of the calling party telephony apparatus).

If it is determined that the provided proof of private key possession is not authentic (i.e., the proof provided does not indicate possession of the private key corresponding to the public key retrieved from the calling party authentication certificate), the called party voice mail apparatus performs the operation 106 (or variant thereof) for providing an authentication failure notification. If it is determined that the provided proof of private key possession is authentic (i.e., the proof provided does indicate possession of the private key corresponding to the public key retrieved from the calling party authentication certificate), the called party voice mail apparatus performs an operation 128 for accessing authenticated identification information from the calling party authentication certificate, followed by an operation 130 for allowing the calling party to access the voice mail message account of the called party. Thereafter, an operation 132 is performed for associating the authenticated identification information with the voice mail account access request (i.e., creating of a voice mail message record).

Upon successful authentication of a caller wanting to leave such a voice mail message, additional filtering mechanisms can allow redirection of the voice mail message into a specific voice mail folder based on the identity of the caller as well as an authenticated name of the caller or caller's organization can be presented in the voice message and/or on the caller id display associated to the telephony equipment at the voice mailbox access premise. In the scenario discussed above where the caller is requesting administrative rights to access messages, such access allows for access to voice mail message records of the called party (i.e., an administrator accessing records or the called party checking its own messages). In the scenario discussed above where the caller is requesting to be allowed to leave a voice mail message in a voice mail account (i.e., voice mailbox) of a voice mail apparatus, such access allows the caller to leave the voice mail message. Accordingly, it is disclosed herein that such access is not limited permitting a particular purpose or function.

Figure 2A:
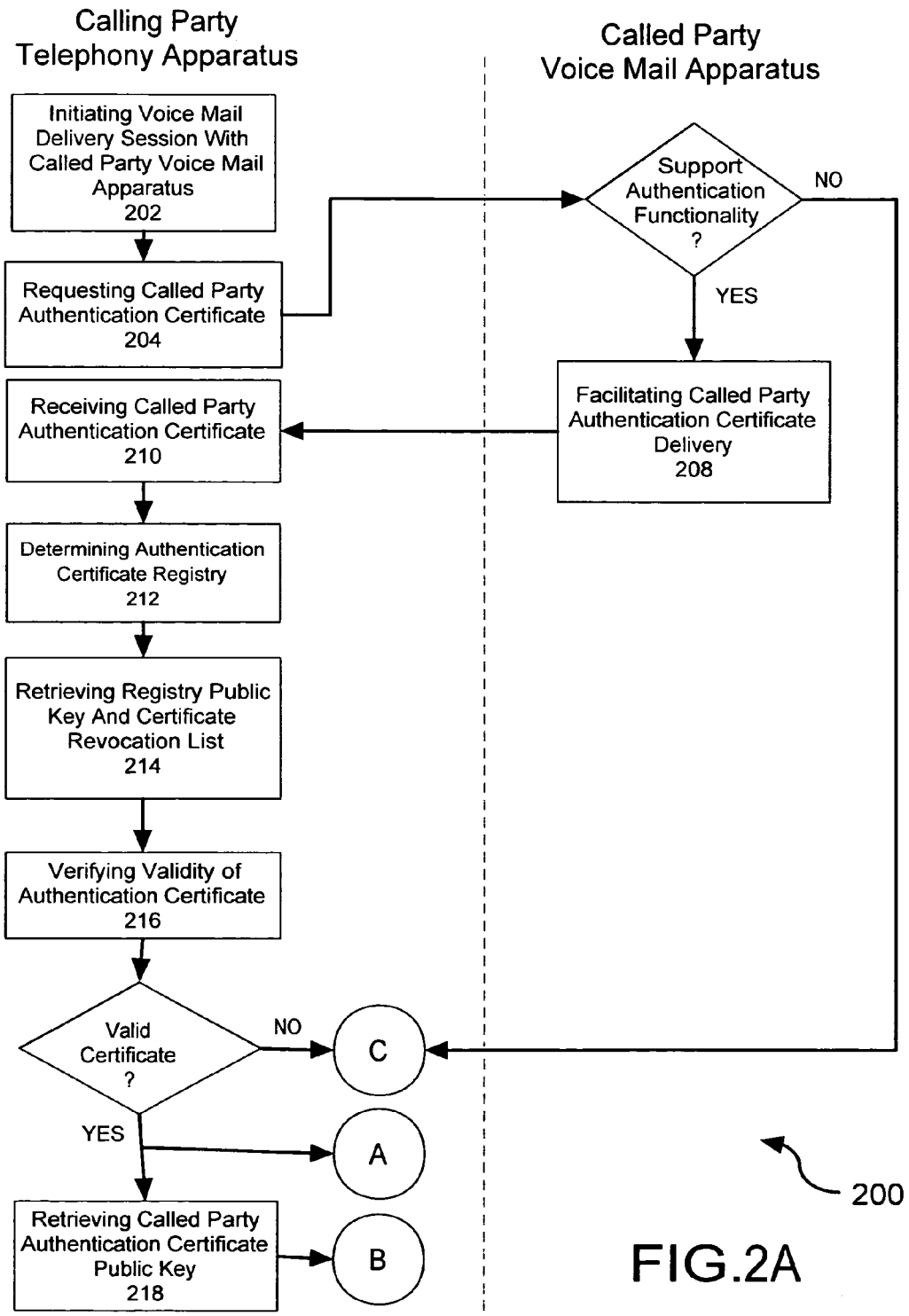
FIGS. 2A and 2B show a method configured for facilitating called party authentication during a voice mail session in accordance with the present invention.
Figure 2B:
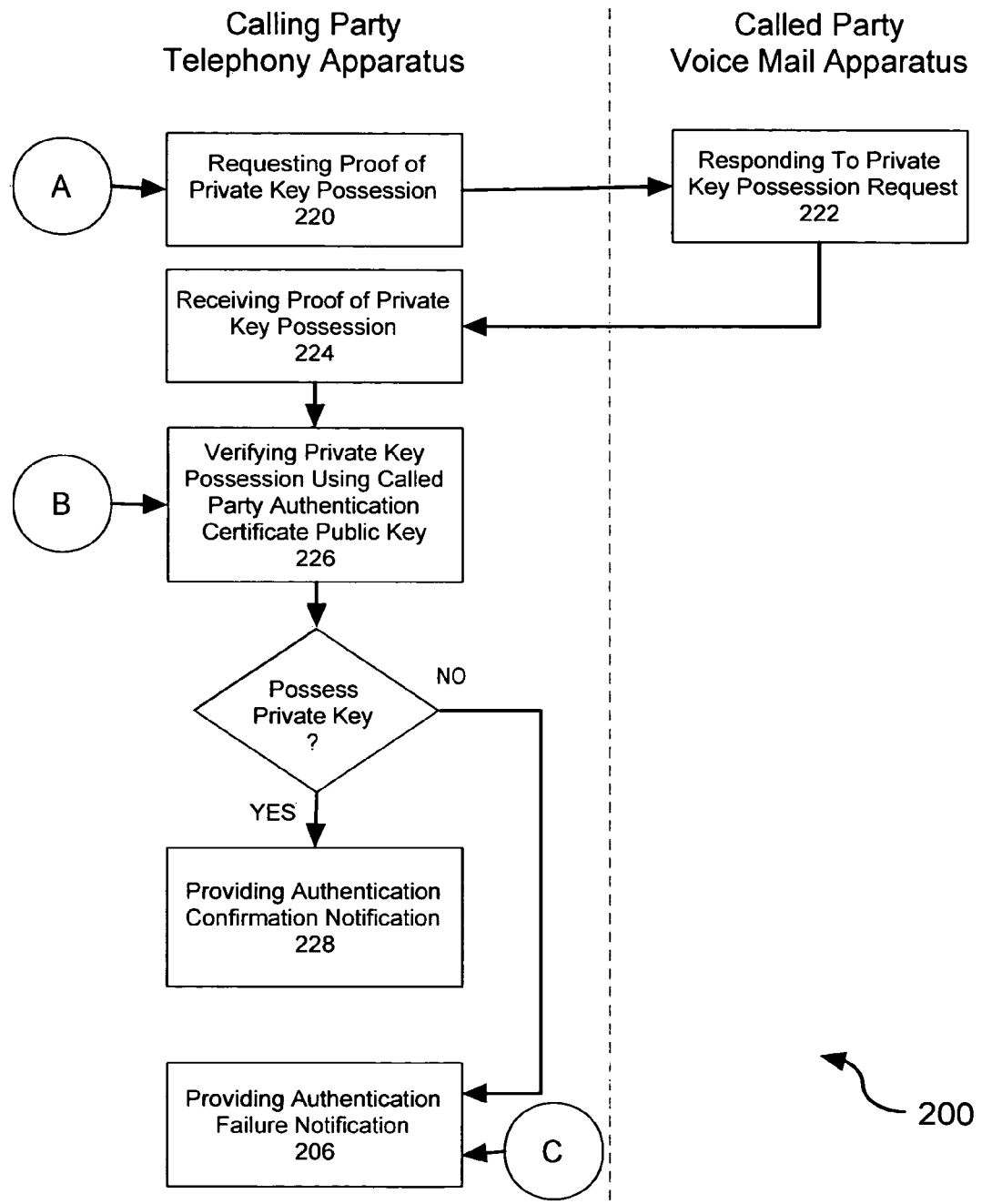

Referring now to FIGS. 2A and 2B, in another embodiment of the present invention (e.g., in combination with or separate from the method 100 for authenticating a caller wanting to access a voice mail account on a voice mail apparatus of a called party), a method 200 for authenticating a called party associated with a voice mail account thereof can be performed. To this end, an operation 202 is performed by a calling party telephony apparatus for initiating a voice mail delivery session with a called party voice mail apparatus. In response to initiating such session, an operation 204 is performed for requesting a called party authentication certificate. In one embodiment, requesting the called party authentication triggers a respective component of authentication functionality in accordance with the present invention, which is provided for by the called party voice mail apparatus. If the called party voice mail apparatus does not support authentication functionality in accordance with the present invention, the calling party telephony apparatus performs an operation 206 (FIG. 2B) for providing an authentication failure notification, which indicates that the called party voice mail apparatus does not support authentication functionality in accordance with the present invention. Examples of providing the authentication failure notification include, but are not limited to, an audible message and/or visual message indicating that the called party voice mail apparatus does not support authentication functionality in accordance with the present invention.

If the called party voice mail apparatus does support authentication functionality in accordance with the present invention, an operation 208 is performed by the called party voice mail apparatus for facilitating called party authentication certificate delivery. For example, in one embodiment, facilitating called party authentication certificate delivery includes accessing the called party authentication certificate and transmitting it for reception by the calling party telephony apparatus. In another embodiment, facilitating called party authentication certificate delivery includes instructing a includes instructing a remote system or apparatus to transmit the called party authentication certificate for reception by the calling party telephony apparatus. Accordingly, the present invention is not limited to any particular approach for facilitating delivery of the called party authentication certificate to the calling party telephony apparatus.

In response to the calling party telephony apparatus performing an operation 210 for receiving the called party authentication certificate, the calling party telephony apparatus performs an operation 212 for determining an authentication certificate registry that issued the called party authentication certificate, followed by performing an operation 214 for retrieving a registry public key and certificate revocation list therefrom. Using such retrieved information, the calling party telephony apparatus performs an operation 216 for verifying validity of the called party authentication certificate. For example, providing the called party authentication certificate is not on the retrieved certificate revocation list, verifying authenticity of the authentication certificate include using the registry public key to determine if the called party authentication certificate was signed by the private key of the authentication certificate registry. If it is determined that the authentication certificate is not authentic (e.g., was not signed by the registry's private key) or if the authentication certificate is on the certificate revocation list, expired, etc, the calling party telephony apparatus performs the operation 206 (or variant thereof) for providing an authentication failure notification (FIG. 2B). In addition to providing the authentication failure notification, it is disclosed herein that a preconfigured optional policy can dictate further action to be taken in the case of the authentication certificate not being successfully authenticated (e.g. trigger an alarm function to appropriate network security management equipment).

If it is determined that the called party authentication certificate is authentic (e.g., was signed by the registry's private key) and the called party authentication certificate is not on the certificate revocation list, the calling party telephony apparatus performs the operation 218 for retrieving the public key from the called party authentication certificate and performs an operation 220 for requesting proof from the called party that the private key corresponding to the called party authentication certificate is in its possession (FIG. 1B). In response to requesting such proof, the called party voice mail apparatus performs an operation 222 for responding to the request thereby causing such proof (i.e., alleged proof at this point) to be transmitted for reception by the calling party telephony apparatus. In response to such proof being sent, the calling party telephony apparatus performs an operation 224 for receiving the proof of private key possession. After receiving the proof of private key possession, the calling party telephony apparatus performs an operation 226 for verifying authenticity of such proof using the called party authentication certificate public key. Verifying such authenticity can be accomplished in the same manner as was discussed above in reference to FIGS. 1A and 1B.

It is disclosed herein that the called party can be an individual or a group of individuals (e.g., a business entity). Thus, a response to the request for proof from the called party that the private key corresponding to the called party authentication certificate is in its possession can be from a specific individual or from one or more individuals authorized or capable of responding to such request. Furthermore, the response can be that of a system of the called party (e.g., a PBX of a business entity) or that of a telephone device (e.g., cell telephone) of the called party. In this manner, the response can be provided in an automated manner (e.g., by a device or system) or can be provided at the command of a person (e.g., in response to their entering a passcode that causes the required proof to be transmitted for reception by the calling party telephony apparatus).

The objective in requesting such proof is to verify that the private key corresponding to the called party authentication certificate is in possession of the called party. One embodiment of requesting such proof includes the calling party telephony apparatus generating a random number (i.e., a "nonce") and transmitting the nonce for reception by the called party voice mail apparatus. In response to receiving the nonce, the called party voice mail apparatus encrypts the nonce with called party's private key (i.e., the private key corresponding to the called party authentication certificate) and transmits the encrypted nonce for reception by the calling party telephony apparatus. In response to receiving the encrypted nonce, the calling party telephony apparatus uses the public key retrieved from the called party authentication certificate to decrypt the encrypted nonce. If the decrypted nonce is the same as that sent, it is assumed that the private key corresponding to the called party authentication certificate is in the possession of the called party (e.g., in possession of the called party voice mail apparatus).

If it is determined that the provided proof of private key possession is not authentic (i.e., the proof provided does not indicate possession of the private key corresponding to the public key retrieved from the called party authentication certificate), the calling party telephony apparatus performs the operation 206 (or variant thereof) for providing an authentication failure notification. If it is determined that the provided proof of private key possession is authentic (i.e., the proof provided does indicate possession of the private key corresponding to the public key retrieved from the called party authentication certificate), the calling party telephony apparatus performs an operation 228 for providing authentication confirmation notification, which can include an authenticated identity of the called party (e.g., as extracted from the called party authentication certificate). Optionally, an operation can be performed by the calling party telephony apparatus for selectively allowing the caller to leave a voice mail message (e.g., unlocking such voice mail message delivery functionality).

As will now be discussed in greater detail, in one embodiment, authentication of a voice mail participant in accordance with the present invention relies on an authenticated identity registry for call parties. The authenticated identity registry can be maintained on a global level, regional level, local level or other level. The present invention is not limited to a particular range for which the registry covers. For the purposes of this disclosure, whenever an entity (e.g., called party) requires access in a specific location area to voice mail participant authentication functionality as taught herein, that entity registers identification information with the local authority managing the registry of authenticated identity registry for call parties for that area or jurisdiction. Upon completion of the registration process, that entity is issued with an authentication certificate (e.g., X.509 certificate) having the identification information embedded therein and being signed by an authenticated caller name-recognized certificate authority. A voice mail apparatus and/or telephony apparatus associated with the entity are then provisioned with such authentication certificates on a per call basis to assert the authenticity of the identification information in a particular jurisdiction.

FIG. 3 shows a schematic diagram of an exemplary registration infrastructure and associated process for registration of call party identification information in accordance with the present invention. Call party identification information refers to authenticated identification information for a caller in a voice mail messaging session and authenticated identification information for a called party in a voice mail messaging session. In this example, a registrant 300 (e.g., a called party) registers with three separate registries: registry 310 is operated by a registration authority (RA) 312 that is a network service provider, registry 320 is operated by a RA 322 that is an interest group (such as a trade association), and registry 330 is operated by a RA 332 that is a geographical or political region (perhaps a government or other official entity). Registrant 300 registers in this manner to provide authenticated identification information to information recipients that subscribe to any one of the available registries. That is, registrant 300 can be authenticated to an information recipient if and only if the information recipient subscribes to one or more of the available registries, in this example, registries 310, 320 or 330.

The respective RA operates each registry. Operating a registry is defined herein to include maintaining information contained in a registry. A RA may be any public or private organization interested in providing an identification information registry. A RA does not require approval from any authority to operate, but may seek endorsement by these authorities. End-users, service suppliers, and/or equipment suppliers can determine if any given registry is trustworthy, and subscribe to only those registries determined to be trustworthy. Each registry is composed of two main parts—the RA (Certification Authority in X.509 parlance) and a database of identification information. Each registry serves a predetermined subscriber group, region and/or a predefined interest group. A region served by one registry may overlap a region served by another registry, and two or more registries may serve the same region. Similarly, two or more different defined interest groups can overlap (e.g., doctors and the more narrowly defined interest group of pediatricians).

The registry 310 is maintained by a network service provider that wishes to provide authentication certificate registry service to any company, public or government organization, or registrant 300 who has a need for providing authenticated identification information via an authentication certificate. The registry 302 is maintained by a interest group such as, for example, the Canadian Bankers Association®, that wishes to provide authentication certificate registry service to its employees, members and/or associates who have a need for providing authenticated identification information via an authentication certificate. The registry 330, which is associated with a with a geographical or political region such as, for example, New York State; the Province of Ontario; the City of Toronto; the greater Chicago area; etc, is maintained by a corresponding government agency or other official entity that wishes to provide authentication certificate registry service to resident persons and entities who have a need for providing authenticated identification information via an authentication certificate.

In one embodiment, the primary responsibilities borne by the RAs 312, 322 or 330 is to ensure proof of identity of any registrant and to ensure that it does not register any duplicate identification information for different registrants. In this embodiment, the registry 310 (which consists of the database and the RA) can be freely inspected by the public and it is at least partially the responsibility of registrants and other interested parties to police the registries 310, 320, 330 in order to ensure that a confusingly similar or misleading information provider identity is not registered by another registrant. When a registrant is registered, each RA issues a corresponding authentication certificate 340. The authentication certificate 340 certifies that the registered identification information of the registrant 330 is bound to a public key of the registrant, which is in turn implicitly paired with a private key of the authentication certificate 340 of the registrant 330.

Presented now is a method for performing registration of a call party (e.g., a called party or a calling party). The authentication certificate provided to each registrant by a registration authority (RA) can conform to any known authentication system, and each RA can use a different authentication system without departing from the scope and spirit of the present invention. When the registrant's identification information is recorded in a registry of a RA, an authentication certificate is provided to the registrant to permit information provider authentication to be performed. The authentication certificate can be based on any public key infrastructure scheme (e.g., X.509). If X.509 certificates are used for the authentication certificates provided to the registrants, in one embodiment of the present invention, the registration process proceeds as follows.

The RA publishes its public key in its root certificate. The root certificate is a certificate that has the public key of the Registration (i.e., certification) Authority. This public key is used to verify authentication certificates, so the root certificate must be imported into each device that will perform the information provider authentication. Typically, it is assumed a vendor or owner of data communication equipment will pre-load the root certificates of interest—including any local regional registries, all popular trade and professional registries, etc. in much the same way that Web browsers are pre-loaded with PKI root certificates today. Optionally, there is a way for allowing the end user to import more root certificates in the cases where the end user does business in multiple regions or is interested in a specialized registry. As understood by those skilled in the art, there is no limit to how many root public keys can be imported or the means for allowing such import. Each interested party (i.e., registry applicant) wishing to become a registrant, generates its own public/private key pair, submits the public key to the RA along with its identification information and any other required registration information and/or documentation for allowing the RA to issue a corresponding authentication certificate.

If the RA determines that the interested party in fact owns or is otherwise in lawful possession of the identification information, the RA enters the identification information into a registry (e.g., a database) and uses the private key of RA to sign an authentication certificate that includes the registrant's identification information and the registrant's public key. The RA therefore "vouches" that the registrant's public key is "the" public key that is bound to the registrant's identification information, and that the registrant is entitled to use that identification information.

The registrant now has a signed authentication certificate that attests to its identification information, and the registrant also has the private key that permits the registrant to validate that authentication certificate. It should be understood that the meaning of the authentication certificate is limited. The authentication certificate only signifies that the holder of the private key (which should be registrant) is entitled to have its identification information displayed in the jurisdiction of the particular registration authority with which the registrant has registered.

Accordingly, in at least one embodiment of the present invention, voice mail session authentication functionality as disclosed herein relies upon registries, which are descriptively referred to herein as "RealName registries", and associated authentication certificates (i.e., RealName certificates). Each RealName registry functions as a certificate authority for authenticated identification information. Examples of such authenticated identification information in accordance with the present invention include, but are not limited to, a name by which an entity is recognized, an image specific to an entity, text specific to an entity, and a sound specific to an entity.

It is disclosed herein that RealName registries operate in effectively the same manner as trademarks registries. Each jurisdiction has its own trademarks registry, with possibly different rules for resolving ownership of a trademark and different rules for determining whether proposed identification information (e.g., a name) infringes an existing trademark. In fact, it is advantageous for RealName registries to be even more decentralized than trademark registries. For example, each jurisdiction can operate its own RealName registry, each profession can operate its own RealName registry, each trade association can operate its own RealName registry, etc. An information recipient (e.g., calling party) can pick and choose which registries they are willing to import. At a minimum, the information recipient will typically import RealName registries for the local jurisdiction and the profession that the information recipient deals with.

With the registries in place, authentication of a caller or called party in a voice mail session can be carried out. Each registry operates as an issuer of authentication certificates, which include authenticated identification information (e.g., a RealName). The authentication certificates can be accomplished by many different approaches. A preferred approach is via X.509 authentication certificates that are used for existing DNS/SSL. X.509 is a standardized public key infrastructure (PKI). In X.509 parlance, each registry (i.e., registration authority) operates as the "Certificate Authority" and each authentication certificate is essentially a package embedding the RealName (i.e., authenticated identification information) and the public key. The private key of the certificate authority then signs this package. In operation, the authentication certificates can be configured to include essentially any type of identification information useful for reinforcing an entity's identity.

Figure 4:
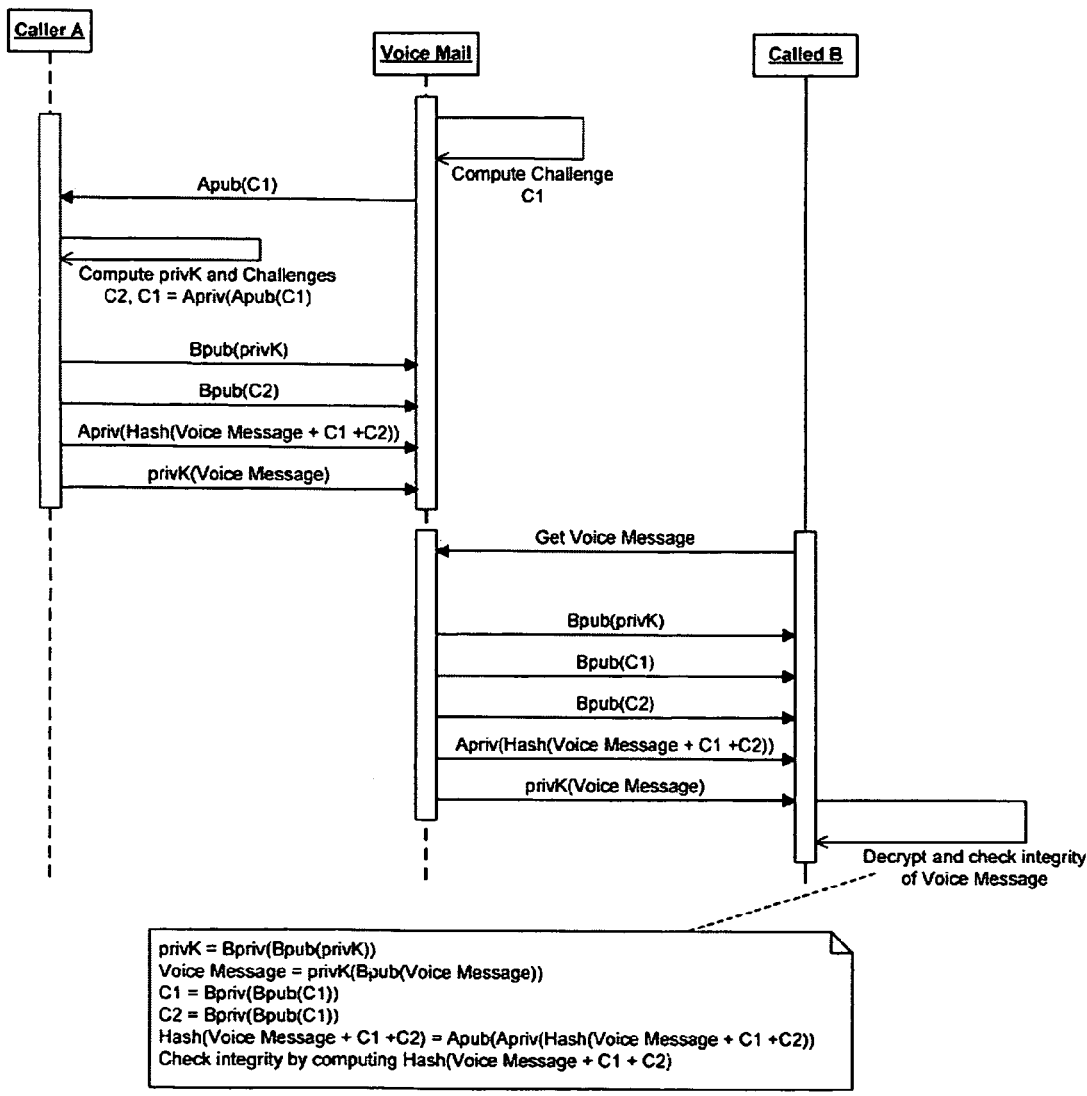
FIG. 4 is a schematic diagram showing a first embodiment of an information identity authentication infrastructure and process performed by a user device executing an identification information authentication application in accordance with the present invention.

The foregoing discussions have assumed that a voice mail apparatus is implicitly trusted by both participants in a voice mail session (e.g., caller and called). In some cases, that assumption may not be true. Accordingly, a solution that provides voice mail session authentication functionality in an end-to-end manner for the caller and/or called party is useful and beneficial. FIG. 4 shows a cryptographic message exchange diagram 400 configured in accordance with an embodiment of the present invention for providing voice mail session authentication functionality in such an end-to-end manner.

The method 400 begins with the voice mail system (i.e., "Voice Mail" as shown in FIG. 4) generate a first random nonce C1 and then sends the first random nonce C1, which is encrypted with caller's public key, for reception by the caller (i.e., i.e., "Caller A" as shown in FIG. 4). The caller retrieves the random nonce C1, which has been decrypted with the private key of the caller, and generates a symmetric key privK and a second random nonce C2. The caller sends the symmetric key privK, which is encrypted with the public key of the called party (i.e., "Called B" as shown in FIG. 4), for reception by the voice mail system. The caller sends the second nonce C2, which is encrypted with the public key of Called B, for reception by the voice mail system. The caller sends a hash of a voice message, the first nonce C1 and the second nonce C2 for reception by the voice mail system. The hash is encrypted with the private key of the caller. The caller sends the voice message, which is encrypted with symmetric key privK, for reception by the voice mail system. Thereafter, the called party requests access to its voice mail account. To allow such access, the voice mail system sends the symmetric key privK, first nonce C1, and second nonce C2, which are encrypted with the public key of Called B. The voice mail system sends the hash of the voice message, C1 and C2, encrypted with the private key of the caller. The voice mail system sends the voice message encrypted with symmetric key privK. The called party retrieves the symmetric key privK, first nonce C1, and second nonce C2, which are decrypted using the private key of the called party. The voice message is decrypted with the symmetric key privK. The called party checks voice message integrity by comparing the computed hash with the one retrieved (i.e., decrypted using the public key of the caller).

Referring now to processor-executable instructions in accordance with the present invention, it will be understood from the disclosures made herein that methods, processes and/or operations configured for facilitating voice mail session authentication functionality as disclosed herein are tangibly embodied by computer readable medium having instructions thereon that are configured for carrying out such functionality. In one specific embodiment, the instructions are tangibly embodied for carrying out one or more of the methodologies disclosed in reference to FIGS. 1 and/or 2. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has imaged thereon instructions (e.g., a computer program) adapted for facilitating voice mail session authentication functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for performing voice mail messaging authentication, comprising:
   establishing a connection between a caller and a voice mail messaging apparatus that provides messaging services for a voice mail account holder;
   receiving, at the voice mail messaging apparatus, a request from the caller to leave a voice mail message for the voice mail account holder;
   receiving a caller authentication certificate of the caller;
   authenticating, by the voice mail messaging apparatus, the caller in response to receiving the caller authentication certificate, wherein said authenticating includes verifying validity of the caller authentication certificate and verifying that the caller is in possession of a private key corresponding to a public key of said caller authentication certificate; and
   creating, by the voice mail messaging apparatus, a voice mail message record in a voice mail account of the voice mail account holder in response to successfully performing said authentication, wherein said creating includes allowing the caller to store the voice mail message in the voice mail account of the voice mail account holder and associating authenticated identification information of the caller with the voice mail message.

2. The method of claim 1, further comprising:
   extracting identification information from said caller authentication certificate in response to successfully verifying that the caller is in possession of the private key corresponding to the public key of said caller authentication certificate thereby allowing said identification information to be associated with the voice mail message as said authenticated identification information of the caller.

3. The method of claim 1 wherein said verifying that the caller is in possession of the private key corresponding to the public key of said caller authentication certificate includes:
   sending a request to the called party for proof that the caller is in possession of the private key corresponding to the public key of said caller authentication certificate; and
   receiving said proof in response to said request.

4. The method of claim 3, further comprising:
   extracting identification information from said caller authentication certificate in response to successfully verifying that the caller is in possession of the private key corresponding to the public key of said caller authentication certificate thereby allowing said identification information to be associated with the voice mail message as said authenticated identification information of the caller.

5. The method of claim 1 wherein:
said receiving said caller authentication certificate includes receiving said caller authentication certificate and an account holder authentication certificate of the voice mail account holder; and
said authenticating includes authenticating the caller using information contained within said caller authentication certificate in response to receiving said caller authentication certificate and authenticating the voice mail account holder using information contained within said account holder authentication certificate in response to successfully authenticating the caller.

6. The method of claim 5 wherein said authenticating includes:
verifying validity of said account holder authentication certificate; and
verifying that the voice mail account holder is in possession of a private key corresponding to a public key of said account holder authentication certificate.

7. The method of claim 6, further comprising:
extracting identification information from said caller authentication certificate in response to successfully verifying that the caller is in possession of the private key corresponding to the public key of said caller authentication certificate thereby allowing said identification information to be associated with the voice mail message as said authenticated identification information of the caller.

8. The method of claim 5, further comprising:
providing authenticated identification information of the voice mail account holder to the caller.

9. A voice mail messaging apparatus including a non-transitory storage apparatus and processor-executable instructions stored on and accessible from the non-transitory storage apparatus, said processor-executable instructions comprising:
processor-executable instructions for establishing a connection between a caller and the voice mail messaging apparatus, wherein the voice mail messaging apparatus provides messaging services for a voice mail account holder;
processor-executable instructions for receiving, at the voice mail messaging apparatus, a request from the caller to leave a voice mail message for the voice mail account holder;
processor-executable instructions for receiving, at the voice mail messaging apparatus, an authentication certificate of the caller;
processor-executable instructions for performing caller authentication in response to receiving the authentication certificate, said caller authentication including verifying validity of the caller authentication certificate and verifying that the caller is in possession of a private key corresponding to a public key of said caller authentication certificate; and
processor-executable instructions for creating a voice mail message record in a voice mail account of the called party in response to successfully authenticating the caller, wherein said creating includes allowing the caller to store the voice mail message in the voice mail account of the called party and associating authenticated identification information of the caller with the voice mail message.

10. The voice mail messaging apparatus of claim 9, further comprising:
processor-executable instructions for requesting the authentication certificate from the caller, wherein receiving the authentication certificate is performed after said requesting.

11. The voice mail messaging apparatus of claim 9, further comprising:
processor-executable instructions for extracting identification information from the authentication certificate in response to successfully verifying that the caller is in possession of the private key corresponding to the public key of the authentication certificate thereby allowing said identification information to be associated with the voice mail message as said authenticated identification information of the caller.

12. The voice mail messaging apparatus of claim 9 wherein verifying that the called party is in possession of the private key corresponding to the public key of the authentication certificate includes:
sending a request to the called party for proof that the called party is in possession of the private key corresponding to the public key of the authentication certificate; and
receiving said proof in response to said request.

13. The voice mail messaging apparatus of claim 12, further comprising:
processor-executable instructions for extracting identification information from the authentication certificate in response to successfully verifying that the caller is in possession of the private key corresponding to the public key of the authentication certificate thereby allowing said identification information to be associated with the voice mail message as said authenticated identification information of the caller.

14. The voice mail messaging apparatus of claim 9, further comprising:
processor-executable instructions for receiving an account holder authentication certificate of the voice mail account holder; and
processor-executable instructions for authenticating the voice mail account holder using information contained within said account holder authentication certificate in response to successfully authenticating the caller.

15. The voice mail messaging apparatus of claim 14, further comprising:
processor-executable instructions for providing authenticated identification information of the voice mail account holder to the caller.

16. A voice mail messaging apparatus including a non-transitory storage apparatus and processor-executable instructions stored on and accessible from the non-transitory storage apparatus, said processor-executable instructions comprising:
processor-executable instructions for establishing a connection between a caller and a voice mail messaging apparatus that provides messaging services for a voice mail account holder;
processor-executable instructions for receiving, at the voice mail messaging apparatus, a request from the caller to authenticate the voice mail account holder prior to leaving a voice mail message for the voice mail account holder;
processor-executable instructions for providing an account holder authentication certificate of the voice mail account holder to the caller in response to the request to enable the caller to authenticate the voice mail account holder by verifying validity of the account holder authentication certificate and verifying that the voice mail messaging apparatus is in possession of a private key corresponding to a public key of the account holder authentication certificate; and processor-executable instructions for storing the voice mail message in a voice mail account of the voice mail account holder in response to a successful authentication of the voice mail account holder.

17. The voice mail messaging apparatus of claim 16, further comprising:

processor-executable instructions for receiving a request from the caller for proof that the voice mail messaging apparatus is in possession of the private key corresponding to the public key of the account holder authentication certificate; and processor-executable instructions for providing said proof to the caller in response to said request.

18. The voice mail messaging apparatus of claim 16, wherein said providing includes:

accessing the account holder authentication certificate; and transmitting the account holder authentication certificate from the voice mail messaging apparatus to the caller.

19. The voice mail messaging apparatus of claim 16, wherein said providing includes instructing, by the voice mail messaging apparatus, a remote apparatus to transmit the account holder authentication certificate to the caller.

* * * * *